United States Patent
Cao et al.

(10) Patent No.: US 9,143,575 B2
(45) Date of Patent: *Sep. 22, 2015

(54) DISTRIBUTED CONTENT CACHING SOLUTION FOR A MOBILE WIRELESS NETWORK

(71) Applicant: SYCAMORE NETWORKS, INC., Chelmsford, MA (US)

(72) Inventors: Yang Cao, Westford, MA (US); Michael Nicolazzo, Philadelphia, PA (US); William M. Turner, Higganum, CT (US); Talbot Hack, Ann Arbor, MI (US); Moshe Suberri, Voorhees, NJ (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/621,990

(22) Filed: Sep. 18, 2012

(65) Prior Publication Data

US 2013/0024500 A1 Jan. 24, 2013

Related U.S. Application Data

(63) Continuation of application No. 12/398,735, filed on Mar. 5, 2009, now Pat. No. 8,271,610, which is a continuation-in-part of application No. 12/250,685, filed on Oct. 14, 2008, which is a continuation-in-part of application No. 12/200,304, filed on Aug. 28, 2008.

(51) Int. Cl.
*G06F 15/16* (2006.01)
*H04L 29/08* (2006.01)

(52) U.S. Cl.
CPC ........ *H04L 67/2819* (2013.01); *H04L 67/2842* (2013.01)

(58) Field of Classification Search
USPC .................................. 709/218, 202, 213, 217
See application file for complete search history.

(56) References Cited

U.S. PATENT DOCUMENTS

| 4,975,830 A | * | 12/1990 | Gerpheide et al. ............ 709/228 |
| 6,047,358 A | | 4/2000 | Jacobs |

(Continued)

FOREIGN PATENT DOCUMENTS

| EP | 1223724 A2 | 7/2002 |
| EP | 1662751 A1 | 5/2006 |
| WO | 01/16788 A2 | 3/2001 |

OTHER PUBLICATIONS

Chinese Office Action for Application No. 200980143014.6, 20 pages, dated May 22, 2013.

(Continued)

*Primary Examiner* — Lan-Dai T Truong
(74) *Attorney, Agent, or Firm* — Finnegan, Henderson, Farabow, Garrett & Dunner LLP

(57) ABSTRACT

A method in an electronic device provides local content to a user device in a communication network. The communication network includes an access network and a core network. In the access network, a content request is intercepted from the user device, which may be formatted according to a network interface. The content request may include a request for data content. Protocol layers associated with an active data session may be terminated so that an edge gateway device may extract and inject packets into the data stream without involving the core network. A cache may be maintained in the access network.

17 Claims, 8 Drawing Sheets

(56) References Cited

U.S. PATENT DOCUMENTS

| | | | |
|---|---|---|---|
| 6,286,074 B1* | 9/2001 | Batchelor et al. | 710/305 |
| 6,591,288 B1 | 7/2003 | Edwards et al. | |
| 6,622,168 B1 | 9/2003 | Datta | |
| 6,754,662 B1 | 6/2004 | Li | |
| 6,941,338 B1 | 9/2005 | Madsen | |
| 7,099,926 B1 | 8/2006 | Ims et al. | |
| 7,409,380 B1 | 8/2008 | Mazzagatti et al. | |
| 8,055,787 B2* | 11/2011 | Victor et al. | 709/238 |
| 8,194,534 B2* | 6/2012 | Pandey et al. | 370/216 |
| 8,271,610 B2 | 9/2012 | Cao et al. | |
| 8,886,656 B2* | 11/2014 | Worrall | 707/752 |
| 2001/0003194 A1 | 6/2001 | Shimura et al. | 709/310 |
| 2002/0065932 A1 | 5/2002 | Kobayashi | |
| 2002/0094813 A1 | 7/2002 | Koshimizu et al. | |
| 2002/0138590 A1 | 9/2002 | Beams et al. | |
| 2003/0006634 A1* | 1/2003 | Hyduk | 297/229 |
| 2003/0055985 A1 | 3/2003 | Corb et al. | |
| 2003/0115346 A1 | 6/2003 | McHenry et al. | |
| 2003/0172236 A1 | 9/2003 | Iyengar et al. | |
| 2004/0107169 A1 | 6/2004 | Lowe | |
| 2004/0128682 A1 | 7/2004 | Liga et al. | |
| 2005/0102300 A1* | 5/2005 | Madsen | 707/100 |
| 2006/0010163 A1 | 1/2006 | Herzog et al. | |
| 2006/0015904 A1 | 1/2006 | Marcus | |
| 2006/0035672 A1 | 2/2006 | Semper | |
| 2006/0069746 A1 | 3/2006 | Davis et al. | |
| 2006/0136556 A1 | 6/2006 | Stevens et al. | |
| 2006/0161671 A1 | 7/2006 | Ryman et al. | |
| 2007/0006021 A1* | 1/2007 | Nicholson et al. | 714/6 |
| 2007/0060099 A1 | 3/2007 | Ramer et al. | |
| 2007/0113243 A1 | 5/2007 | Brey | |
| 2007/0156965 A1 | 7/2007 | Sundarrajan et al. | |
| 2007/0244929 A1 | 10/2007 | Huang et al. | |
| 2007/0250601 A1* | 10/2007 | Amlekar et al. | 709/219 |
| 2007/0294721 A1 | 12/2007 | Haeuser et al. | |
| 2008/0008176 A1 | 1/2008 | Lim et al. | |
| 2008/0065718 A1* | 3/2008 | Todd et al. | 709/203 |
| 2008/0104634 A1 | 5/2008 | Gajdos et al. | |
| 2008/0120364 A1 | 5/2008 | Chari et al. | |
| 2008/0125131 A1 | 5/2008 | Guo | |
| 2008/0139189 A1 | 6/2008 | Hyatt | |
| 2008/0163290 A1 | 7/2008 | Marko | |
| 2008/0188260 A1 | 8/2008 | Xiao et al. | |
| 2008/0235292 A1* | 9/2008 | Janin et al. | 707/201 |
| 2008/0267114 A1 | 10/2008 | Mukherjee et al. | |
| 2009/0006634 A1* | 1/2009 | Parsell et al. | 709/228 |
| 2009/0006813 A1* | 1/2009 | Singhal et al. | 712/207 |
| 2009/0305712 A1 | 12/2009 | Franceschini et al. | |
| 2010/0023582 A1 | 1/2010 | Pedersen et al. | |
| 2010/0030963 A1 | 2/2010 | Marcu et al. | |
| 2010/0057926 A1 | 3/2010 | Cao et al. | |
| 2010/0057995 A1 | 3/2010 | Cao et al. | |
| 2011/0013554 A1 | 1/2011 | Koskinen | |
| 2011/0098075 A1* | 4/2011 | Bienas et al. | 455/517 |

OTHER PUBLICATIONS

Amiri, Khalil et al., "On space management in a dynamic edge data cache," World Wide Web and Databases International Workshop, pp. 1-6 (2002).

International Search Report for Application No. PCT/US09/54998, dated Oct. 13, 2009.

International Search Report and Written Opinion for Application No. PCT/US2009/060646, dated Mar. 11, 2010.

International Search Report and Written Opinion for Application No. PCT/US2010/025157, dated Jul. 22, 2010.

International Preliminary Report on Patentability for Application No. PCT/US09/54998, dated Aug. 18, 2010.

International Preliminary Report on Patentability for Application No. PCT/US2010/025157, 8 pages, dated May 3, 2011.

Chinese Office Action dated Nov. 13, 2013 for Application No. 200980143014.6.

Extended European Search Report dated Jul. 30, 2015 for EP Application No. 09810522.4; 7 pages.

* cited by examiner

DISTRIBUTED CONTENT CACHING SOLUTION FOR A MOBILE WIRELESS NETWORK

RELATED APPLICATION INFORMATION

This Application is a Continuation of U.S. patent application Ser. No. 12/398,735, filed on Mar. 5, 2009, which is a Continuation-In-Part of U.S. patent application Ser. No. 12/250,685, filed on Oct. 14, 2008, which is a Continuation-In-Part of U.S. patent application Ser. No. 12/200,304, filed on Aug. 28, 2008. The contents of the aforementioned Applications are hereby incorporated by reference.

BACKGROUND

A communication network typically includes a core network and at least one access network. The core network is the central part of the communication network and serves as the backbone of the communication network. The core network typically includes high capacity switches and transmission equipment. Each access network serves as a point of contact with the communication network for users. Access networks connect subscribers with their service providers. A communication network may have multiple access networks, serving different sets of users, in communication with a single core network.

A communication network may deliver content to a user. Typically, a user device in an access network will create a request for a certain piece of content, and forward that request through the access network to the core network. A core services platform may be located within the core network. A core services platform is a device that performs a variety of services. For example, the core services platform may identify a location where the requested content is stored. Typically, this location is a content storage repository. The content storage repository may be located in the same access network as the user, in a different access network, or in the core network. The core services platform then may coordinate the retrieval of the requested content from the content storage repository, and may coordinate the delivery of the requested content back to the user device.

SUMMARY

A content caching mechanism is provided for a communication network such as, for example, a wireless content delivery network. In the communication network, an electronic device resides in the access network and manages a cache.

According to one embodiment, a method is performed in an electronic device. The method provides content to a user device in a communication network. The communication network includes an access network and a core network. In the access network, a content request is intercepted from the user device, which may be formatted according to a network interface. The content request may include a request for data content. According to one embodiment, this procedure may involve terminating the protocol layers associated with an active data session so that an edge gateway may extract and inject packets into the data stream without involving the core network.

Intercepting the data may be accomplished anywhere in the access network, including at a base station, or an edge gateway device.

Subsequently, a cache provided in an electronic caching device located in the access network may be queried to determine whether the data content is present in the cache. If the data content is provided in the cache, the content is retrieved and forwarded to the user device. If not, the data content may be requested from the core network.

In some embodiments, the edge gateway device interacts with a network controller managing a plurality of network channels. The network controller may switch from a first network channel to a second network channel in order to conserve network resources. However, it may be desirable to cause the controller to remain on a first channel that is active while the electronic caching device is sourcing data content. To prevent the network controller from switching channels, the edge gateway device may activate a down-switch timer having a timer value less than the down-switch timer value of the network controller. The edge gateway device may send a ping of an up-switch threshold size greater than the network controller's up-switch threshold size to the core network before the edge gateway device's down-switch timer has expired. The reply ping from the core network may then fill the network controller's downlink transmission buffer, causing the network controller to conclude that the active channel is not idle and remaining on the active channel. When the need for the controller to remain on the active channel passes, the edge gateway device's down-switch timer may be deactivated, allowing the controller to switch to a second channel, for example a common channel.

Further, an electronic device is provided for managing content in a communication network. The electronic device includes storage for storing instructions for managing the content and a processor for executing instructions.

According to other embodiments, an electronic device readable storage medium storing executable instructions for managing a cache in an access network is also provided.

DETAILED DESCRIPTION

In exemplary embodiments described herein, an electronic device in a communication network manages a cache that stores data. The communication network may include a core network and at least one access network. The access network may be configured to intercept data requests from a user device, and serve the requested data locally. This allows intermediate service platforms in the local access network to serve data with minimal involvement from the core network, conserving network resources.

Figure 1:
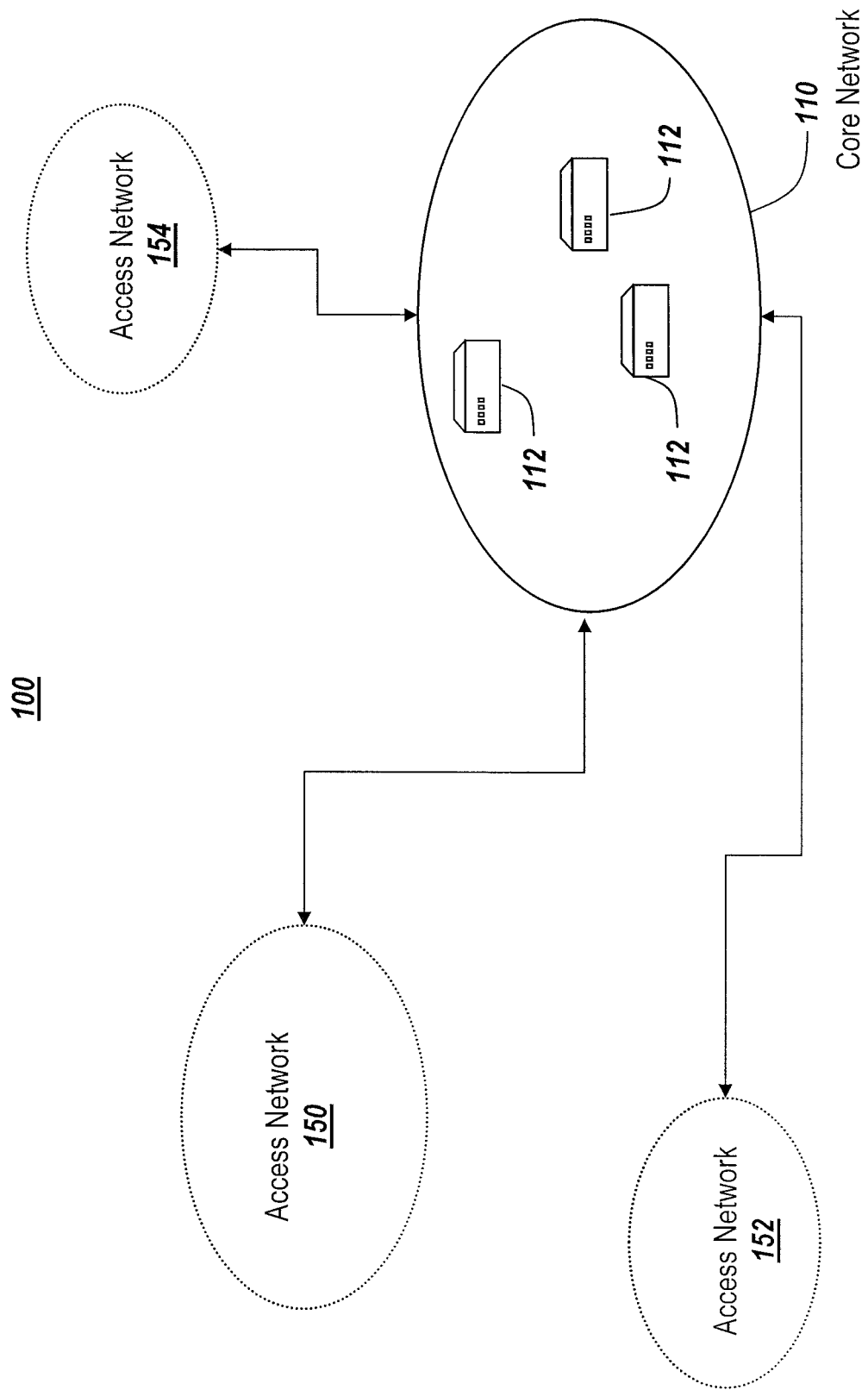
FIG. 1 depicts a communication network suitable for exemplary embodiments.

FIG. 1 depicts a communication network 100 suitable for exemplary embodiments. According to one embodiment, the communication network 100 may be a wireless network and includes a core network 110 and access networks 150, 152 and 154. Each access network 150, 152 and 154 serves as a point of contact with the communication network for users, and connect subscribers with their service providers. Nevertheless, those skilled in the art will appreciate that the communication network 100 may include wired networks as well. According to other embodiments, communication network 100 may include more or fewer access networks. One skilled in the art will recognize that the functionality described herein example is equally applicable in different types of communication networks, such as a network utilizing a WiFi framework, a UTRAN or UMTS framework, a CDMA framework, a WiMax framework, or a UMB framework, among others.

The communication network 100 may have multiple access networks, serving different sets of users, in communication with a single core network. Examples of access networks include the UMTS Terrestrial Radio Access Network (UTRAN), the GSM Radio Access Network (GRAN), and the GSM Edge Radio Access Network (GERAN).

Core services platforms 112 located in core network 110 may provide services within the core network, such as (but not limited to) fetching data from a storage repository or routing data throughout communications network 100. A core services platform 112 can take a number of forms, depending on the services to be provided. For example, core services platforms 112 may be servers within core network 110. Alternatively, a core services platform 112 may be a switch or a router, a server such as a file server or a mail server, a network bridge, a network hub, or a repeater.

Figure 2:
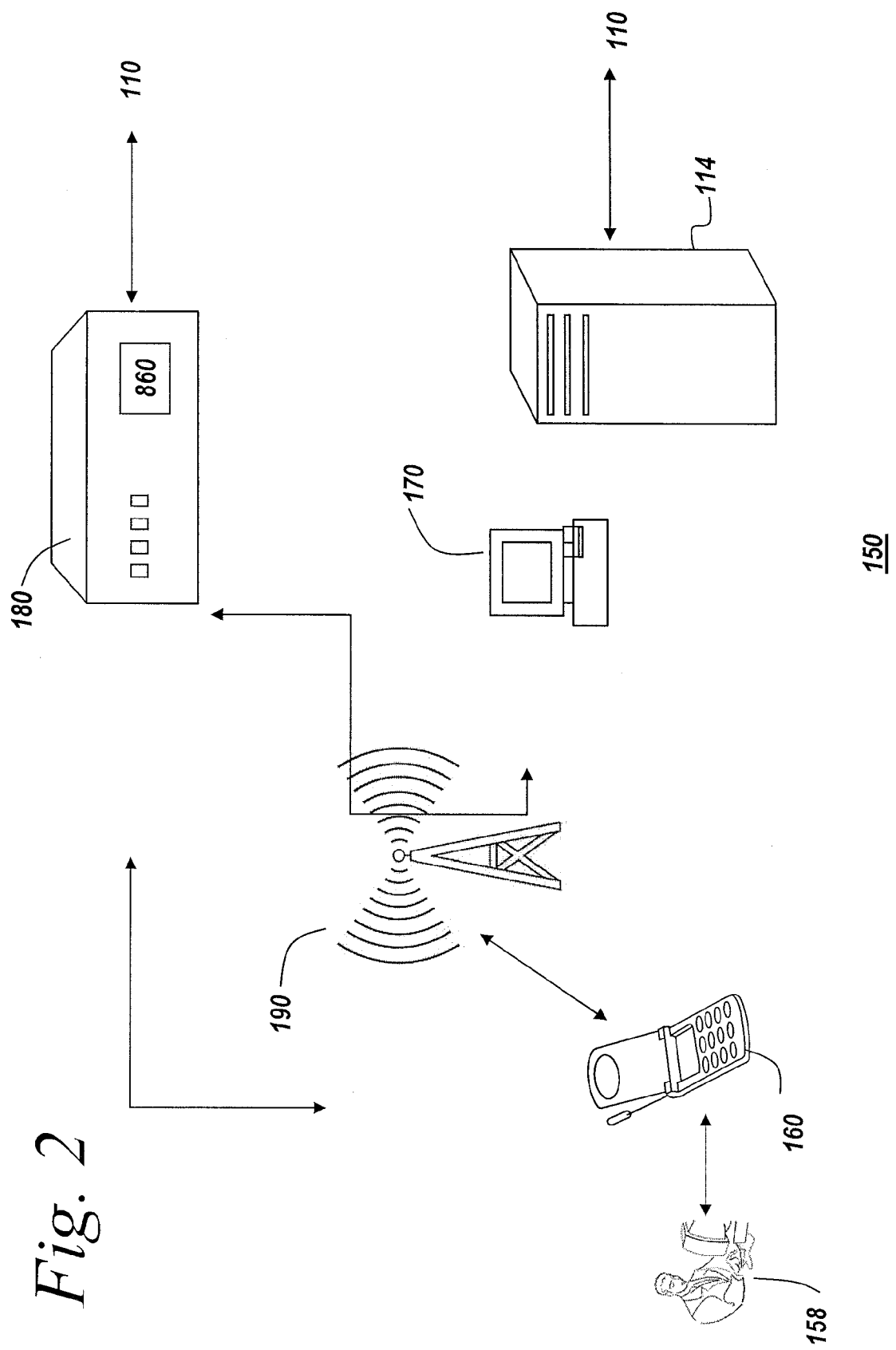
FIG. 2 depicts access network 150 of FIG. 1 in more detail.

FIG. 2 depicts an exemplary access network 150 in more detail. In access network 150, an electronic device 170 maintains a cache. Electronic device 170 may be, for example: a server, a router, a computer system, or a custom-designed device. Alternatively, the cache may be maintained at another device in the access network, such as base station 190, intermediate service platform 180, or user device 160.

Alternatively, electronic device 170 maintaining the cache 400 may be located in the core network 110, or in another access network, such as access network 152 or access network 154.

Storage repository 114 may be located within core network 110, or alternatively may be located in an access network. In FIG. 2, storage repository 114 is depicted in the access network 150. Storage repository 114 may be a file server, though it may be another type of device capable of storing content, such as a personal computer, a mail server, a cellular phone, a personal digital assistant, or a Global Positioning System device.

A user 158 using a user device 160 may interact with access network 150 via a communications device 330 such as a modem, fiber optic connection, or a transmitter and receiver for radio communication. User device 160 may be, for example, but is not limited to, a computing device, a personal digital assistant, a cellular phone, or a Global Positioning System device. User device 160 may send and receive data through a base station 190 located in access network 150. Base station 190 may be, for example, a gateway, a cell tower, a Node B, or an Enhanced Node B.

The base station 190 may interact with one or more intermediate service platforms 180 located in access network 150 or may interact directly with core network 110. Intermediate service platforms 180 may perform tasks such as resource management (directing control of the network in a manner that allows the efficient use of network resources), filtering (inspecting incoming and outgoing data in order to remove extraneous, harmful, or harassing data), and routing (directing network traffic towards its appropriate destination). Examples of intermediate service platforms 180 include, but are not limited to, Radio Network Controllers, bridges, routers, and Virtual Private Network (VPN) servers. In some embodiments, the intermediate service platform may maintain a timer, such as a down-switch timer, which is used in switching between network channels. The timer will be discussed in more detail below.

When user 158 requests data, the core network 110 may locate the requested data in a storage repository 114. For simplicity, FIG. 2 depicts storage repository 114 in access network 150. However, the present invention is not so limited. For example, storage repository 114 may be in the user device's access network 150, or core network 110, or in a different access network 152. Once storage repository 114 is located, the data may be sent back to the user device 160, potentially after being routed through the core network 110.

Once data has been retrieved from storage repository 114, it may be routed through access network 150 via intermediate service platform 180 or base station 190, or both. Intermediate service platform 180 or base station 190 may maintain a cache 400 for temporarily storing recently used data. For ease of discussion, the Figures depict the cache device as a separate electronic device 170, though electronic device 170 may be the same as intermediate service platform 180 or base station 190.

If the same data is subsequently requested from user device 160, or a different user device in the same access network 150, intermediate service platform 180 or base station 190 may check its cache 400 to see if cache 400 contains an up-to-date copy of the data 450. If cache 400 does contain an up-to-date copy of the data 450, then the copy of the data 450 may be forwarded to the user device 160. Thus, it is not necessary to fetch the same data multiple times, and hence a trip through core network 110 is avoided.

Figure 3:
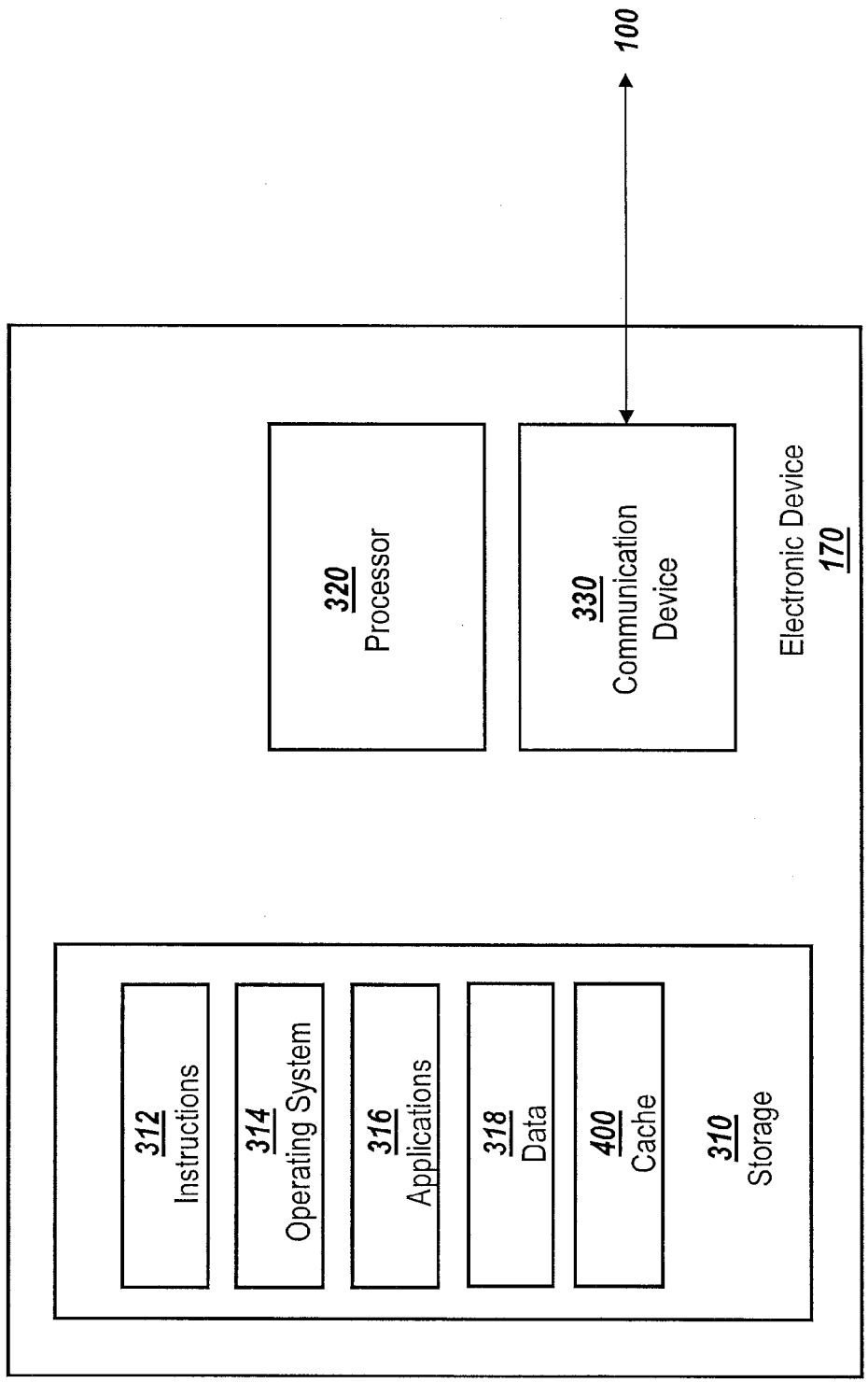
FIG. 3 depicts electronic device 170 of FIG. 2 in more detail.

FIG. 3 depicts electronic device 170 in more detail. Electronic device 170 may contain a storage 310 for storing instructions 312 to be executed by a processor 320, such as a microprocessor, ASIC, FPGA, or a controller. Instructions 312 may be storage on one or more electronic device readable media. Examples of electronic device-readable or computer-readable storage media include, but are not limited to, RAM, ROM, magnetic storage media, or optical storage media. Instructions 312 may cause processor 320 to perform a series of steps described in detail below. Instructions 312 may be in any form that describes how to perform these steps. For example, the instructions may be uncompiled code in any suitable programming language, compiled code, assembly language instructions, or any other type of instructions.

Storage 310 may also store an operating system 314 for operating electronic device 170. Storage 310 may store additional applications 316 for providing additional functionality, as well as data 318 for use by the electronic device 170 or another device. Storage 310 also stores a cache 400, which will be discussed in more detail with reference to FIG. 4.

Electronic device 170 may have a communication device 330 for communicating with communication network 100. Communication device 330 may be, for example, a modem, an Ethernet connection, a fiber optic connection, a radio antenna, or any suitable means for communicating with a network.

Electronic device 170 may proxy a transport protocol in access network 150. For example, if the network is a UMTS network, electronic device 170 may proxy an Iu-B or an Iu-PS protocol. However, the present disclosure is not limited to implementation in a UMTS network, and may be deployed in any suitable communication network. The transport protocol employed will vary based on the type of communication network utilized.

Figure 4:
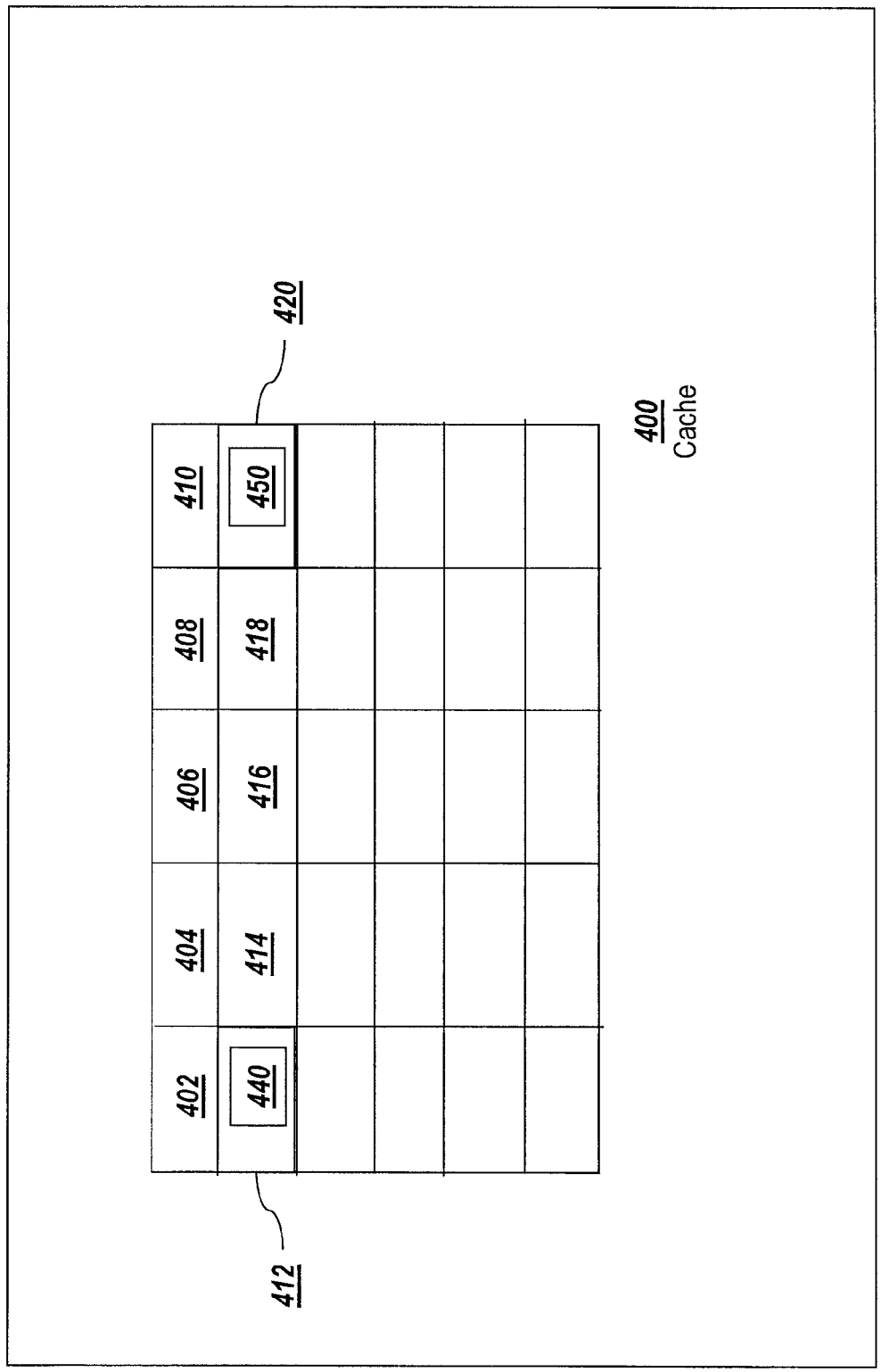
FIG. 4 depicts an example of cache 400.

FIG. 4 depicts an example of cache 400. Cache 400 may be stored in storage 310 of electronic device 170. For ease of discussion, the exemplary cache 400 is shown logically-sectioned into sections 402-420, each section representing an equal amount of storage space. Cached objects 440 and 450 are present in the cache. Objects 440 and 450 represent data that has been recently requested by user device 160.

Cached objects 440 and 450 may represent any type of data than can pass through the network. For example, if user device 160 has requested a web page from the World Wide Web, the request may be forwarded to core network 110, which may locate the web page on storage repository 114. The web page may consist, for example, of two elements, an HTML document 440 and an image present in document 450. These elements will be referred to as "objects." Cached content may be executable content, such as a computer program or other executable content, or the cached content may be non-executable content, such as a JPEG image file. Executable content is content that can be executed by an electronic device to cause the electronic device to perform indicated tasks according to encoded instructions. Non-executable content includes, for example, data files, parameters, and variables.

Core network 110 may route cached objects 440 and 450 back through access network 150 towards user device 160. As the data passes through intermediate service platform 180, intermediate service platform 180 forwards this data to electronic device 170 to be cached.

Alternatively, cache 400 may be maintained directly on intermediate service platform 180 (FIG. 2). In the present example, cache 400 is maintained on electronic device 170 (FIG. 3), which is shown separately from the intermediate service platform 180 for ease of discussion.

Because electronic device 170 maintains cache 400 storing objects 440 and 450, future requests for the web page that objects 440 and 450 represent may be intercepted at intermediate service platform 180 (FIG. 2). These future requests may come from user device 160 (FIG. 2), or any other user device in access network 150 (FIG. 2). The electronic device 170 (FIG. 3) will determine whether objects 440 and 450 are still up to date using any of a number of methods. For example, some objects carry a "time-to-live" (TTL) tag that specifies how long the object will be considered valid before it becomes out-of-date or "stale." Alternatively, a user device may specify when an object should be forcefully refreshed in cache 400. Other conditions that may indicate that an object is out-of-date will be discussed in more detail in relation to FIG. 6.

If the cached objects 440 and 450 are still up to date, then cached objects 440 and 450 may be provided back to the requesting user device, thus preventing the need for a request to be fulfilled through core network 110.

Figure 5:
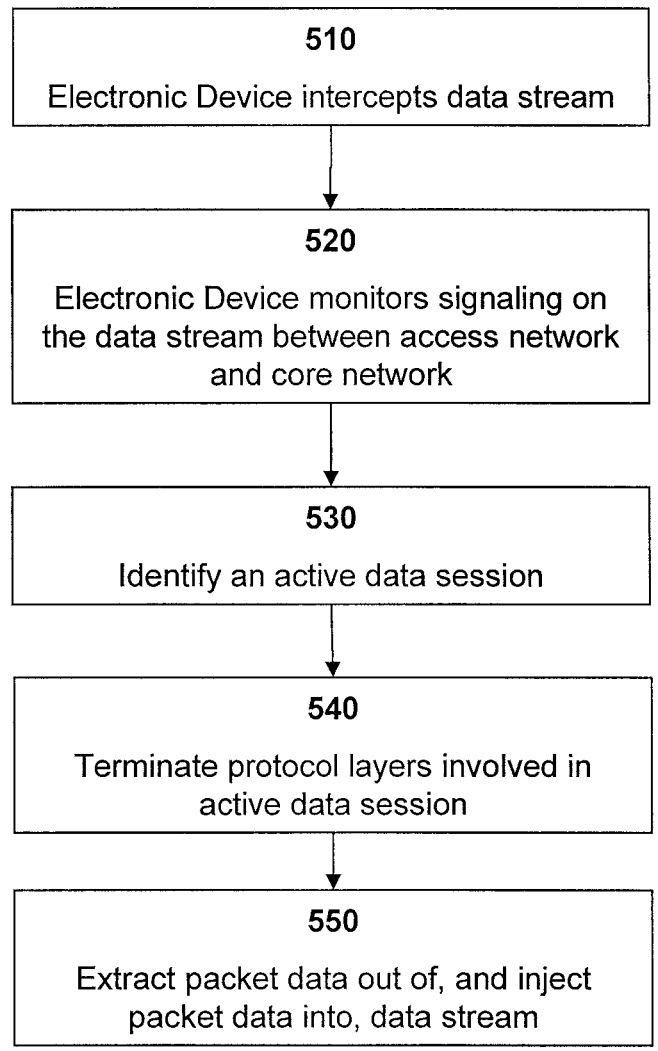
FIG. 5 depicts a flow chart of steps that may be performed in order to manage and maintain a cache 400.

FIG. 5 depicts a flow chart of steps that may be performed in order to manage and maintain cache 400. In step 510, an electronic device intercepts a data stream bound from user device 160 in an access network 150 towards the core network 110. The electronic device may be intermediate service platform 180, electronic device 170, base station 190, or another electronic device. For simplicity, it is assumed that the electronic device in step 510 is intermediate service platform 180. The intermediate service platform 180 may intercept the data stream in a number of ways. The data stream may be routed through intermediate service platform 180 during the normal course of operation of the access network 150. In this case, intermediate service platform 180 can monitor the data stream directly. In other circumstances, the data stream may not pass directly through intermediate service platform 180 in the normal course of the operation of the access network 150, and may instead be routed through other devices to the core network 110. In this case, intermediate service platform 180 may actively reach out to other devices in the network in order to determine if a data stream exists to be intercepted, and may then intercept the data stream using a known protocol. In other situations, intermediate service platform 180 may either indicate to other devices that the other devices should forward data streams to intermediate service platform 180, or indicate that a data stream has been received so that a decision can be made as to whether to intercept the data stream. Alternatively, the other devices may be preconfigured to forward data streams or information about data streams to intermediate service platform 180 without any direct input from intermediate service platform 180.

In step 520, the intermediate service platform 180 monitors signaling on the data stream between the access network and the core network for an active data session. For example, if the network is a UTRAN network, the intermediate service platform 180 may be an edge gateway, and the edge gateway may intercept an IuB interface from the base station 190, which may be a Node B or Enhanced Node B. Alternatively, if the intermediate service platform 180 is collocated with an Enhanced Node B with an IuPS interface with a direct connection to the core network 110, then the intermediate service platform 180 may monitor the IuPS interface. If an active data session is identified at step 530, then the protocol layers involved in the active data session are terminated in step 540. Terminating the protocol layers be accomplished by simply not forwarding requests for data to the core network. If the data stream was initially routed through intermediate service platform 180 on its way to the core network (and thus intermediate service platform 180 was able to intercept the data without the involvement of other devices in the network), then the intermediate service platform 180 may actively or passively terminate the protocol layers by itself. Any connections associated with the protocol layers may be explicitly closed, or may be left open without forwarding information related to the active data session through them. Alternatively, if intermediate service platform 180 intercepted the data stream from another device, then intermediate service platform 180 may forward instructions to the other device to terminate the protocol layers. Intermediate service platform 180 may include instructions to terminate the protocol layers at the time that it intercepts the data stream from the other device, prior to intercepting the data stream, or after intercepting the data stream. The other device may also be preconfigured to terminate the protocol layers without any explicit instructions when the data stream is intercepted, after the data stream is intercepted, or when it identifies a data stream that will be intercepted.

Because the intermediate service platform 180 terminates the data protocols, the intermediate service platform 180 is free to extract and inject packet data into the data stream at step 550 without involving the core network 110.

Figure 6:
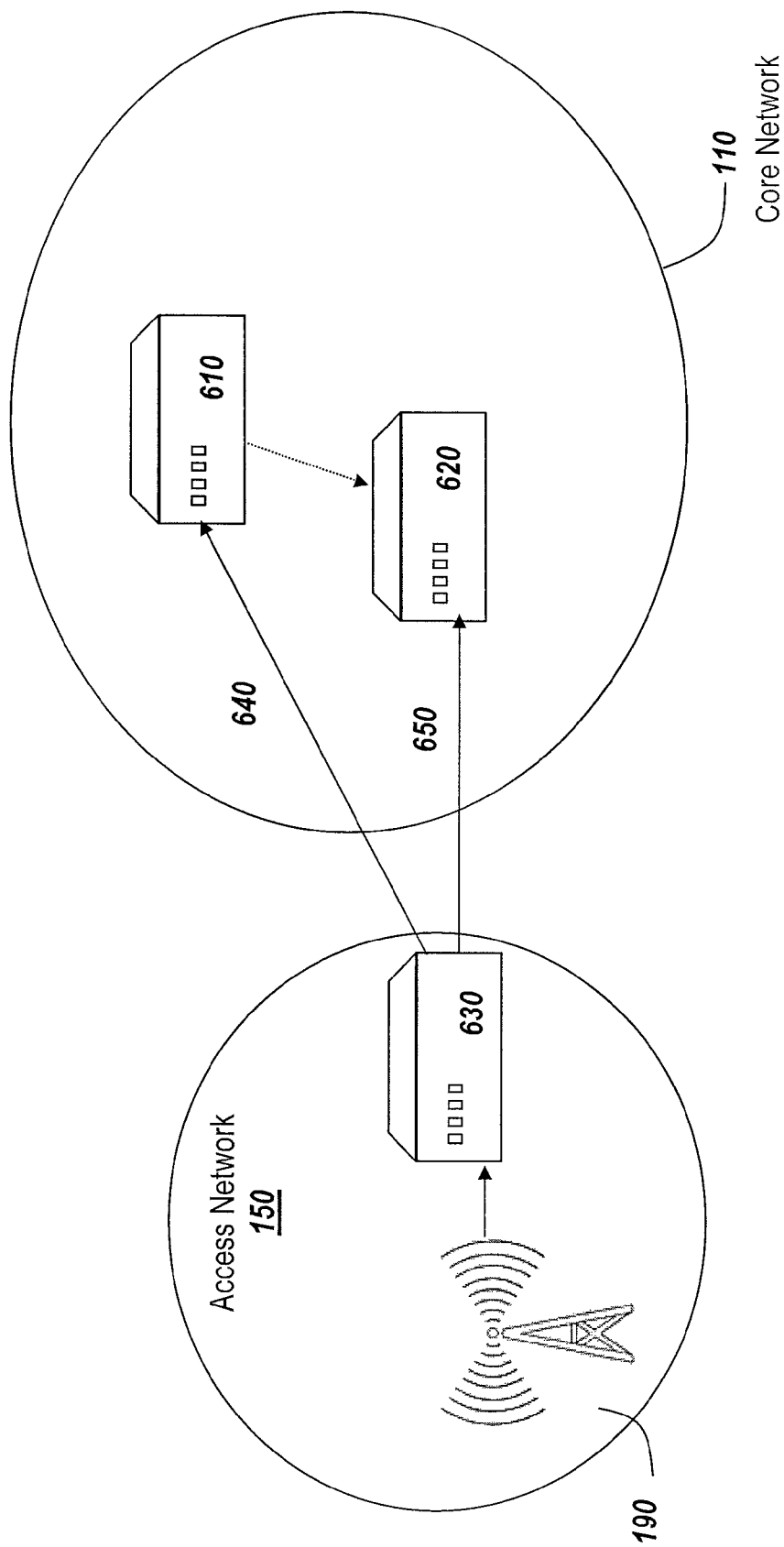
FIG. 6 depicts a "one tunnel approach" used in some embodiments of the present invention.

In some embodiments, as depicted in FIG. 6, the network may implement a "one tunnel approach," wherein an edge gateway 610 in the access network 150 establishes a connection with a Gateway GPRS Support Node (GGSN) 620. A Serving GPRS Support Node (SGSN) 630 may facilitate the connection. In such a network configuration, the edge gateway may communicate with the SGSN using an IuPS protocol 640, and the GGSN via a Gn protocol 650. In this case, the intermediate service platform 180 may intercept both the IuPS interface 640 and the Gn interface 650 at step 510. The intermediate service platform may then monitor the IuPS interface 640 at step 520, and may extract and inject packets over the Gn interface 650 at step 550.

In step 550, the intermediate service platform 180 may forward a data request to the electronic device 170, which maintains a local cache 400 in the access network. The electronic device 170 may determine whether the content may be served from the local cache 400 by querying the cache to determine whether the requested data is present in the cache 400. If the data is present in the local cache 400 (a "content hit"), then the data is forwarded back to the user device 160. The data may be forwarded through intermediate service platform 180. If the data is not present in the local cache 400 (a "content miss"), then the electronic device 170 may request the data from the core network 110. Such a request may be forwarded through the intermediate service platform 180. Once the data is received back at the electronic device 170, it may be cached for future use in the cache 400 and forwarded back to the user device 160.

Figure 7:
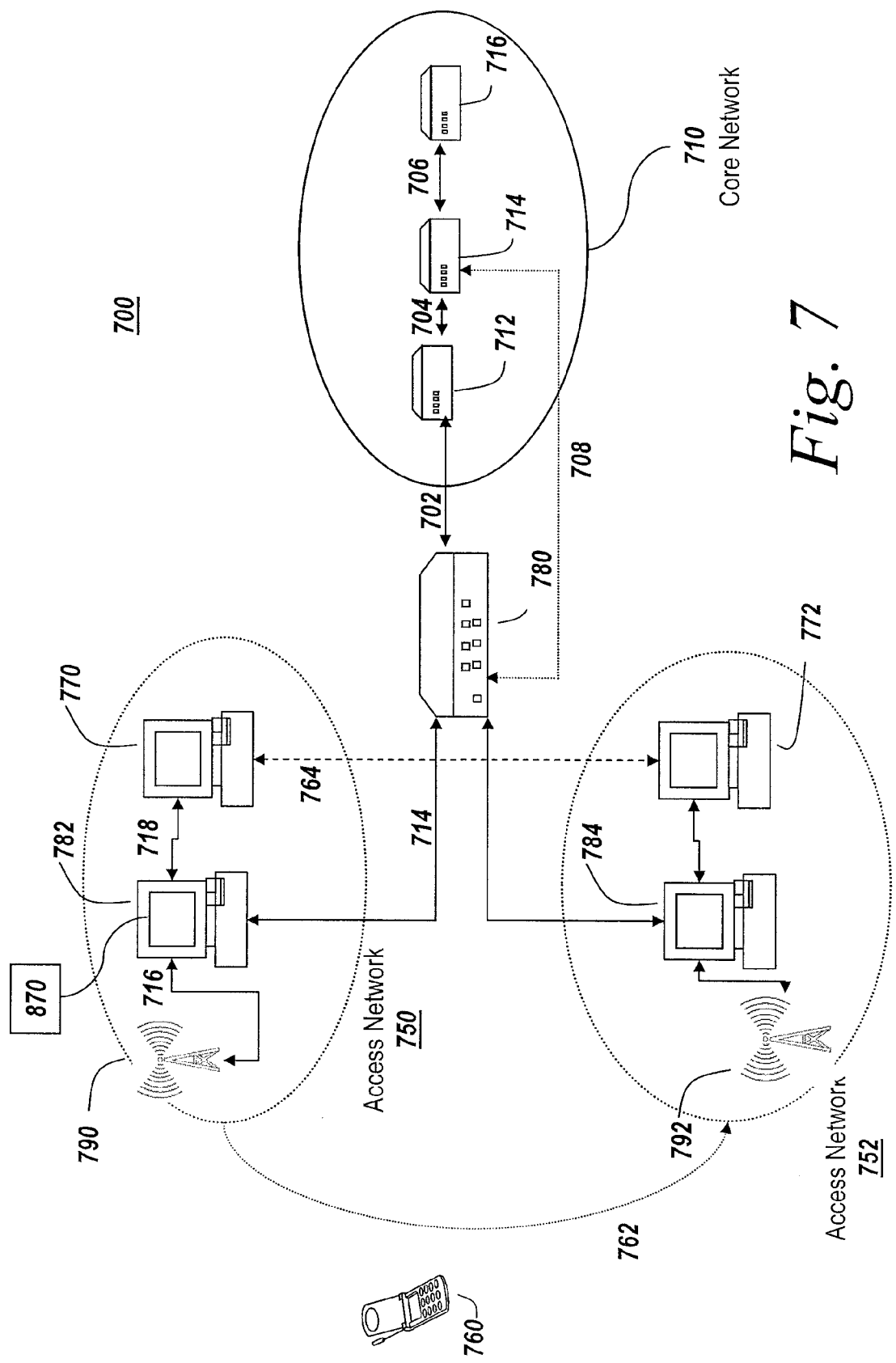
FIG. 7 depicts an exemplary procedure followed in the network when a user moves between access networks.

In a mobile network, a user may be free to move. A user's movement may result in the user changing from a first access network to a second access network. FIG. 7 depicts the user device 760 moving between access networks 750 and 752. In FIG. 7, a network 700 includes a core network 710 and two access networks 750 and 752. A user device 760 initially interacts with access network 750. An exemplary procedure followed in the network when a user requests data or moves between access networks is described below with reference to FIG. 7.

Intermediate service platforms 782 and 784, for example routers, serve as edge gateways for the access networks 750 and 752, respectively. Intermediate service platforms 782 and 784 each communicate with the intermediate service platform 780 using a type of interface 714, for example an IuB interface.

An intermediate service platform 780, for example a Radio Network Controller, sits between the access networks 750 and 752 and the core network 710. Intermediate service platform 780 communicates with the core network 710 using a type of interface 702. For example, the core network may include a core services platform 712, such as an SGSN, and the intermediate service platform 780 may communicate with the core services platform 712 using an Iu interface. Devices within the core network may further communicate with each other using other interfaces 704 and 706. For example, core services platform 712 may communicate with another core services platform 714, which may be a GGSN, using a Gn interface 704. The core services platform 714 may further communicate with a core services platform 716, such as a Central Content Distribution Network Server, using another interface 706 (such as Gi interface). Optionally, in the "one tunnel" approach discussed above, the intermediate service platform 780 may also communicate directly with the core service platform 714 using another interface 408, such as a Gn interface.

In access network 750, an intermediate service platform 782, such as a router, communicates with intermediate service platform 780 via an interface 714. Intermediate service platform 784 in access network 752 may communicate with intermediate service platform 780 using the same type of interface 714, or may use a different type of interface. Electronic devices 770 and 772 may provide local cache services for their respective access networks. Base stations 790 and 792 provide a point of contact with user devices, such as user device 760. Intermediate service platforms 782 and 784 may communicate with base stations 790 and 792, respectively using an interface 716, for example an IuB interface. Alternatively, intermediate service platforms 782 and 784 may communicate with base stations 790 and 792 using different types of interfaces. In some embodiments, at least one of the intermediate service platforms, such as intermediate service platform 782, may maintain a down-switch timer 870, which will be discussed in more detail below.

The user device 760 may send a request for data content to the network, and in doing so, may cause the base station 790 to start signaling the intermediate service platform 780. The intermediate service platform 782 may monitor this signaling to identify an active data session, for example, an active data session initiated on behalf of electronic device 760. To accomplish this, the intermediate service platform 782 may intercept the interface 716. Once an active data session is identified, the intermediate service platform 782 may terminate the protocol layers involved in the active data session. The intermediate service platform 782 may then extract packet data from the intercepted interface 716, and inject data back onto the intercepted interface 716.

If the intermediate service platform 782 receives a request for data on the intercepted interface 716, the intermediate service platform 782 may forward the request to an electronic device 770 maintaining a cache 400 in the access network via interface 718. The electronic device 770 may query the cache 400 to see whether the requested data is present in the cache 400. If the requested data is present, the electronic device 770 may forward a copy of the requested data to intermediate service platform 782 via interface 718. Intermediate service platform 782 may then forward the data to the user device 760 through the base station 790. In this way, the requested data may be provided to the user without involving the core network 710.

Alternatively, if the requested data is not found in the cache 400, the electronic device 770 may request the data from the core network 110. The electronic device 770 may forward the request for data through intermediate service platform 782 via interface 718. Once the electronic device 770 acquires the requested data from the core network 710, the electronic device 770 may store the requested data in the cache 400 so that future requests may be served locally through the access network 750 rather than through the core network 710.

If the user moves between the access networks, such that user device 760 now interacts with access network 752 instead of access network 750, a request for data may be forwarded to the new electronic device 772 maintaining a local cache in the access network 752. If the data is not found in the cache of electronic device 772, the electronic device 772 may request the data from the core network 710, as described above. Alternatively, the electronic device 772 may request the data from the electronic device 770, which maintains the cache in the user device 760's original access network 750. By communicating with the electronic device 770 using an interface 764, for example an IuB interface, the electronic device 772 may be able to acquire the requested data without involving the core network 710

In some embodiments, intermediate service platform 780 may be a network controller, such as a radio network controller, that switches between different network channels for a variety of purposes. For example, a radio network controller ("RNC") may switch an HSDPA call from the HS-DSCH and DCH to the FACH/RACH common channels when the HSDPA channel is idle. This allows the RNC to conserve network resources during periods of inactivity. To determine whether the HSDPA channel is idle, the RNC maintains a system-configured inactivity timer known as the down-switch timer 860 (FIG. 2). The value of the down-switch timer 860, which may be expressed in seconds, represents an amount of time. If a certain amount of network traffic has not utilized the HSDPA channel in the amount of time represented by the down-switch timer 860, the RNC switches to the common channel. This minimum amount of network traffic required to keep the RNC on the HS-DSCH and DCH channels is known as the up-switch threshold, and it may be expressed in, for example, bytes.

When the electronic device 770 sources data locally in accordance with the present invention, this may cause the network controller to assume that the currently-used channel is idle. As a result, the network controller may switch to the common channel, which reduces available bandwidth for content sourcing and causes service degradation. In order to prevent this, it may be necessary to force the network controller to remain on the currently active channel.

Figure 8:
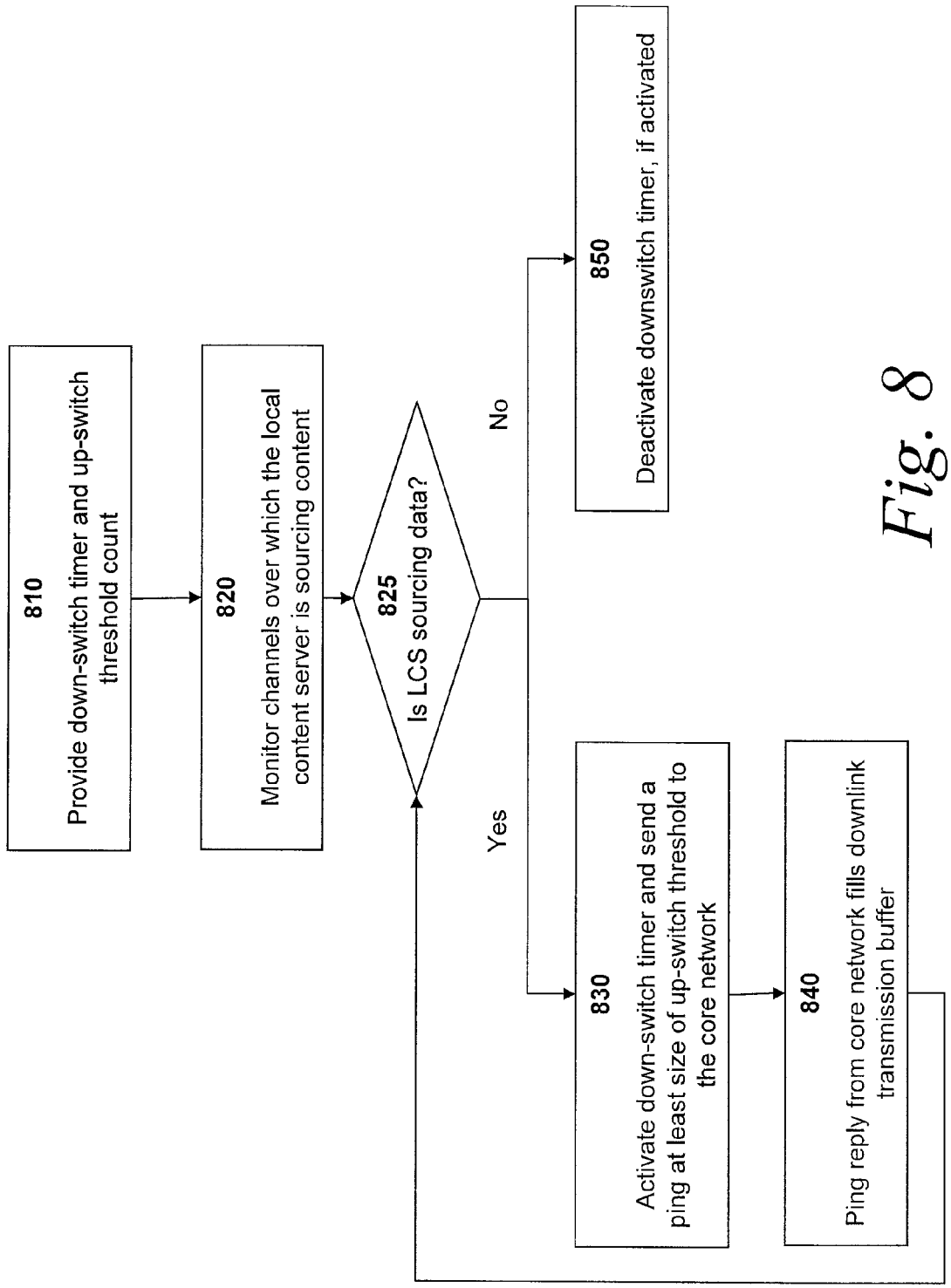
FIG. 8 depicts a procedure to prevent channel switching by an electronic device managing a number of channels in a network during local content sourcing.

FIG. 8 depicts a procedure to prevent channel switching by an electronic device managing a number of channels in a network during local content sourcing. In one exemplary embodiment, at step 810 the intermediate service platform 782 maintains a second down-switch timer 870 (FIG. 7) with a value less than the network controller's down-switch timer. The intermediate service platform 782 also maintains a second up-switch threshold with a value larger than the network controller's up-switch threshold.

At step 820, the intermediate service platform 782 monitors the channels over which electronic device 770 is sourcing data. If the intermediate service platform 782 determines, at step 725, that the electronic device 770 (the "local content server," or LCS) is sourcing data, then the intermediate service platform 782 activates the down-switch timer at step 830. Before the amount of time specified by the down-switch timer has elapsed, the intermediate service platform 782 sends a ping of size at least equal to the up-switch threshold to the core network 710. A "ping" is a tool used in computer networks to test a number of parameters in the network. A ping may be, for example, a data packet from one device to another. A first device may send a ping, for example, an ICMP echo request packet, to a second device. The second device may respond with an ICMP echo response reply when it receives the initial ping. When the first device receives the ping reply, the first device may use the reply to calculate network parameters, such as the round-trip time from when the first ping was sent to when the reply ping was received. The first device may also use pings to measure the amount of data loss in a network, or to determine whether another device is reachable, or to determine what route a data stream will use through the network when communicating between two devices.

When the intermediate service platform 782 sends a ping to the core network 710 as described above, the core network 710 sends a reply ping back to the access network 752. This ping reply passes through the intermediate service platform 780, which in this example represents the network controller. Because the down-switch timer maintained by the intermediate service platform 782 is less than the down-switch timer maintained by the intermediate service platform 780, the ping reply arrives at the intermediate service platform 780 before intermediate service platform 780's down-switch timer has elapsed. Further, because the up-switch threshold maintained by the intermediate service platform 782 is greater than the up-switch threshold maintained by the intermediate service platform 780, the ping reply exceeds intermediate service platform 780's up-switch threshold. This causes the ping reply to fill the intermediate service platform 780's downlink transmission buffer at step 850, which causes the intermediate service platform 780 to remain on the active channel.

On the other hand, if the electronic device 770 is not actively sourcing data (step 825), then the intermediate service platform 782 deactivates the down-switch timer at step 850. This allows the intermediate service platform 780 to revert to the common channel when the active channel is actually idle, conserving network resources.

Although the above description has been given with specific examples from a mobile network, one having ordinary skill in the art will recognize that the present invention is not so limited, and may be applied in any type of network.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

The invention claimed is:

1. A method comprising:
    acquiring, at a device of a first network, a request for data content from a user device, the request being targeted at a server located in a second network;
    communicating with a cache of the first network, using the request, to acquire at least some data content using the request, wherein the at least some data content is provided to the user device via the first network;
    acquiring a threshold value and a timer value, the threshold value indicating a threshold size of data to be transmitted in the second network and the timer value indicating a duration of time for sending the threshold size of data to maintain a quality of service provided by the second network for the user device;
    determining that the cache of the first network is providing the at least some data content via the first network; and
    responsive to the determination, transmitting one or more data packets to the second network within a duration based on the acquired threshold value and the acquired timer value.

2. The method of claim 1, further comprising:
    stopping the request for the data content from being transmitted to the server, after acquiring the request.

3. The method of claim 1, wherein the request for the data content allows the cache to acquire the requested data content from the server, upon determining that the requested data content is not present in the cache.

4. The method of claim 1, wherein the device of the first network is a base station.

5. The method of claim 4, wherein the device of the first network is a Node B.

6. The method of claim 4, wherein the device of the first network is an enhanced Node B.

7. The method of claim 1, wherein the device of the first network is collocated with an edge gateway device.

8. The method of claim 1, wherein the transmitted one or more data packets to the second network are targeted at a network controller managing a plurality of network channels in the second network.

9. The method of claim 8, wherein the network controller is capable of switching from a first network channel to a second network channel to conserve network resources, and the transmitted one or more data packets to the second network causes the controller to remain on the first channel while the cache of the first network is providing the at least some data content to the user device via the first network.

10. The method of claim 9, wherein the network controller is capable of switching from the first network channel to the second network channel upon detecting that data of a size below the threshold value is transmitted in the second network for a duration longer than the timer value, wherein the total size of the transmitted one or more data packets is at least equal to the threshold value, and wherein the transmitting of the one or more data packets occurs within a duration equal to the timer value.

11. A non-transitory electronic device readable storage medium storing executable instructions causing an electronic device of a first network to perform a method, the method comprising:
   acquiring a request for data content from a user device, the request being targeted at a server located in a second network;
   communicating with a cache of the first network, using the request, to acquire at least some data content using the request, wherein the at least some data content is provided to the user device via the first network;
   acquiring a threshold value and a timer value, the threshold value indicating a threshold size of data to be transmitted in the second network and the timer value indicating a duration of time for sending the threshold size of data to maintain a quality of service provided by the second network for the user device;
   determining that the cache of the first network is providing the at least some data content via the first network; and
   responsive to the determination, transmitting one or more data packets to the second network within a duration based on the acquired threshold value and the acquired timer value.

12. The electronic device readable medium of claim 11, further comprising: stopping the request for the data content from being transmitted to the server, after acquiring the request.

13. The medium of claim 11, wherein the request for the data content allows the cache to acquire the requested data content from the server, upon determining that the requested data content is not present in the cache.

14. An electronic device comprising:
   one or more non-transitory electronic device storage media configured to store instructions; and
   one or more processors configured to execute the instructions to cause the electronic device to:
   acquire a request for data content from a user device, the request being targeted at a server located in a second network;
   communicate with a cache of the first network, using the request, to acquire at least some data content using the request, wherein the at least some data content is provided to the user device via the first network;
   acquire a threshold value and a timer value, the threshold value indicating a threshold size of data to be transmitted in the second network and the timer value indicating a duration of time for sending the threshold size of data to maintain a quality of service provided by the second network for the user device;
   determine that the cache of the first network is providing the at least some data content via the first network; and
   responsive to the determination, transmit one or more data packets to the second network within a duration based on the acquired threshold value and the acquired timer value.

15. The electronic device of claim 14, wherein the processors are further configured to execute the instructions to cause the electronic device to:
   stop the request for the data content from being transmitted to the server, after acquiring the request.

16. The electronic device of claim 14, wherein the request for the data content allows the cache to acquire the requested data content from the server, upon determining that the requested data content is not present in the cache.

17. The electronic device of claim 14, wherein the cache is located in the device of the first network.

* * * * *